(12) United States Patent
Huang

(10) Patent No.: US 11,899,974 B2
(45) Date of Patent: Feb. 13, 2024

(54) METHOD AND APPARATUS FOR PERFORMING AUTOMATIC SETTING CONTROL OF MEMORY DEVICE IN PREDETERMINED COMMUNICATIONS ARCHITECTURE WITH AID OF AUXILIARY SETTING MANAGEMENT

(71) Applicant: Silicon Motion, Inc., Hsinchu County (TW)

(72) Inventor: Han-Cheng Huang, Taipei (TW)

(73) Assignee: Silicon Motion, Inc., Hsinchu County (TW)

( * ) Notice: Subject to any disclaimer, the term of this patent is extended or adjusted under 35 U.S.C. 154(b) by 176 days.

(21) Appl. No.: 17/586,719

(22) Filed: Jan. 27, 2022

(65) Prior Publication Data
US 2023/0106393 A1    Apr. 6, 2023

Related U.S. Application Data

(60) Provisional application No. 63/252,613, filed on Oct. 5, 2021.

(51) Int. Cl.
*G06F 3/06* (2006.01)

(52) U.S. Cl.
CPC .......... *G06F 3/0659* (2013.01); *G06F 3/0604* (2013.01); *G06F 3/0634* (2013.01); *G06F 3/0679* (2013.01)

(58) Field of Classification Search
CPC .... G06F 3/0659; G06F 3/0604; G06F 3/0634; G06F 3/0679; G06F 3/0632
See application file for complete search history.

(56) References Cited

U.S. PATENT DOCUMENTS

| 7,836,265 B2 * | 11/2010 | Fukuguchi .......... G06Q 30/018 705/317 |
| 9,251,891 B1 * | 2/2016 | Hu .......................... G11C 16/26 |
| 2003/0156473 A1 | 8/2003 | Sinclair |

(Continued)

FOREIGN PATENT DOCUMENTS

| CN | 109947358 A | 6/2019 |
| CN | 111164565 A | 5/2020 |
| TW | 201917576 A | 5/2019 |

*Primary Examiner* — Sean D Rossiter
(74) *Attorney, Agent, or Firm* — Winston Hsu

(57) ABSTRACT

A method for performing automatic setting control of a memory device in predetermined communications architecture with aid of auxiliary setting management and associated apparatus are provided. The method may include: during initialization of the memory device, utilizing a processing circuit within a memory controller to load an auxiliary setting management table from a non-volatile memory into at least one storage unit of a hardware control circuit within the memory controller to be a loaded auxiliary setting management table, wherein the hardware control circuit is used for the automatic setting control; and utilizing the hardware control circuit within the memory controller to detect occurrence of a series of events according to state information of a transmission interface circuit within the memory controller, and to dynamically perform parameter setting on the transmission interface circuit according to the series of events, for reconfiguring the transmission interface circuit at runtime of the memory device.

13 Claims, 8 Drawing Sheets

(56) References Cited

U.S. PATENT DOCUMENTS

| | | | |
|---|---|---|---|
| 2008/0104340 A1* | 5/2008 | Shih | G06F 13/161 |
| | | | 711/154 |
| 2009/0172308 A1 | 7/2009 | Prins | |
| 2017/0269870 A1* | 9/2017 | So | G06F 3/0608 |
| 2020/0159456 A1* | 5/2020 | Mukaida | G06F 3/0658 |
| 2021/0258442 A1* | 8/2021 | Yoshimura | H04N 1/00938 |
| 2021/0294899 A1* | 9/2021 | Sakamoto | G06F 3/0623 |

* cited by examiner

METHOD AND APPARATUS FOR PERFORMING AUTOMATIC SETTING CONTROL OF MEMORY DEVICE IN PREDETERMINED COMMUNICATIONS ARCHITECTURE WITH AID OF AUXILIARY SETTING MANAGEMENT

CROSS REFERENCE TO RELATED APPLICATIONS

This application claims the benefit of U.S. Provisional Application No. 63/252,613, which was filed on Oct. 5, 2021, and is incorporated herein by reference.

BACKGROUND OF THE INVENTION

1. Field of the Invention

The present invention is related to memory control, and more particularly, to a method and apparatus for performing automatic setting control of a memory device in a predetermined communications architecture with aid of auxiliary setting management.

2. Description of the Prior Art

A memory device may comprise Flash memory for storing data, and the management of accessing the Flash memory is complicated. For example, the memory device may be a memory card, a solid state drive (SSD), or an embedded storage device such as that conforming to Universal Flash Storage (UFS) specification. When a manufacture tries to enhance some features of the memory device according to MIPI UniPro specification, some problems may occur. More particularly, the memory device may operate in any of multiple modes and may enter or leave any of multiple states, but in some situations, complicated control operations within the memory device may rely on loading additional firmware code at runtime to execute the additional firmware code, causing the overall performance to be reduced. The related art tries to correct the problem, but further problems such as some side effects may be introduced. Thus, a novel method and associated architecture are needed for solving the problems without introducing any side effect or in a way that is less likely to introduce a side effect.

SUMMARY OF THE INVENTION

It is therefore an objective of the present invention to provide a method and apparatus for performing automatic setting control (e.g., automatic parameter setting control) of a memory device in a predetermined communications architecture (e.g., a UFS communications architecture) with aid of auxiliary setting management, in order to solve the above-mentioned problems.

At least one embodiment of the present invention provides a method for performing automatic setting control of a memory device in a predetermined communications architecture with aid of auxiliary setting management, where the method can be applied to a memory controller of the memory device. The memory device may comprise the memory controller and a non-volatile (NV) memory, and the NV memory may comprise at least one NV memory element (e.g., one or more NV memory elements). The method may comprise: during initialization of the memory device, utilizing a processing circuit within the memory controller to load an auxiliary setting management table from the NV memory into at least one storage unit of a hardware control circuit within the memory controller to be a loaded auxiliary setting management table, wherein the hardware control circuit is used for the automatic setting control; and utilizing the hardware control circuit within the memory controller to detect occurrence of a series of events according to state information of a transmission interface circuit within the memory controller, and to dynamically perform parameter setting on the transmission interface circuit according to the series of events, for reconfiguring the transmission interface circuit at runtime of the memory device, wherein the transmission interface circuit is reconfigured with data carried by one or more entries among multiple entries of the loaded auxiliary setting management table.

In addition to the above method, the present invention also provides a memory device, and the memory device comprises a NV memory and a memory controller. The NV memory is arranged to store information, wherein the NV memory may comprise at least one NV memory element (e.g. one or more NV memory elements). The memory controller is coupled to the NV memory, and the memory controller is arranged to control operations of the memory device. In addition, the memory controller comprises a processing circuit that is arranged to control the memory controller according to a plurality of host commands from a host device, to allow the host device to access the NV memory through the memory controller. The memory controller further comprises a transmission interface circuit, and the transmission interface circuit is arranged to perform communications with the host device. The memory controller further comprises a hardware control circuit, and the hardware control circuit is arranged to perform automatic setting control of the memory device. For example, during initialization of the memory device, the memory controller utilizes the processing circuit within the memory controller to load an auxiliary setting management table from the NV memory into at least one storage unit of the hardware control circuit within the memory controller to be a loaded auxiliary setting management table, wherein the hardware control circuit is used for the automatic setting control; and the memory controller utilizes the hardware control circuit within the memory controller to detect occurrence of a series of events according to state information of the transmission interface circuit within the memory controller, and to dynamically perform parameter setting on the transmission interface circuit according to the series of events, for reconfiguring the transmission interface circuit at runtime of the memory device, wherein the transmission interface circuit is reconfigured with data carried by one or more entries among multiple entries of the loaded auxiliary setting management table.

According to some embodiments, an associated electronic device is also provided. The electronic device may comprise the above memory device, and may further comprise: the host device, coupled to the memory device. The host device may comprise: at least one processor, arranged for controlling operations of the host device; and a power supply circuit, coupled to the at least one processor, arranged for providing power to the at least one processor and the memory device. In addition, the memory device may provide the host device with storage space.

In addition to the above method, the present invention also provides a memory controller of a memory device, where the memory device comprises the memory controller and a NV memory. The NV memory may comprise at least one NV memory element (e.g. one or more NV memory elements). In addition, the memory controller comprises a processing circuit that is arranged to control the memory controller according to a plurality of host commands from a host device, to allow the host device to access the NV memory through the memory controller. The memory controller further comprises a transmission interface circuit, and the transmission interface circuit is arranged to perform communications with the host device. The memory controller further comprises a hardware control circuit, and the hardware control circuit is arranged to perform automatic setting control of the memory device. For example, during initialization of the memory device, the memory controller utilizes the processing circuit within the memory controller to load an auxiliary setting management table from the NV memory into at least one storage unit of the hardware control circuit within the memory controller to be a loaded auxiliary setting management table, wherein the hardware control circuit is used for the automatic setting control; and the memory controller utilizes the hardware control circuit within the memory controller to detect occurrence of a series of events according to state information of the transmission interface circuit within the memory controller, and to dynamically perform parameter setting on the transmission interface circuit according to the series of events, for reconfiguring the transmission interface circuit at runtime of the memory device, wherein the transmission interface circuit is reconfigured with data carried by one or more entries among multiple entries of the loaded auxiliary setting management table.

According to some embodiments, the memory controller of the memory device may control the operations of the memory device according to the method, and the memory device may be installed in the electronic device. The apparatus may comprise at least one portion (e.g., a portion or all) of the electronic device. For example, the apparatus may comprise the memory controller within the memory device. In another example, the apparatus may comprise the memory device. In some examples, the apparatus may comprise the electronic device.

According to some embodiments, the memory device may store data for the host device. The memory device may read the stored data in response to a host command from the host device, and provide the host device with the data read from the NV memory.

The present invention method and apparatus can guarantee that the memory device can operate properly in various situations. For example, the memory device (e.g., the memory controller) can load an auxiliary setting management table from the NV memory into at least one storage unit (e.g., one or more one storage units) within a hardware control circuit during initialization of the memory device (e.g., the memory controller), for performing the automatic setting control (e.g., the automatic parameter setting control) of the memory device, and therefore does not need to load any firmware code such as any in-system programing (ISP) code from the NV memory at runtime to execute the any firmware code. In addition, the present invention method and apparatus can solve the related art problems without introducing any side effect or in a way that is less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
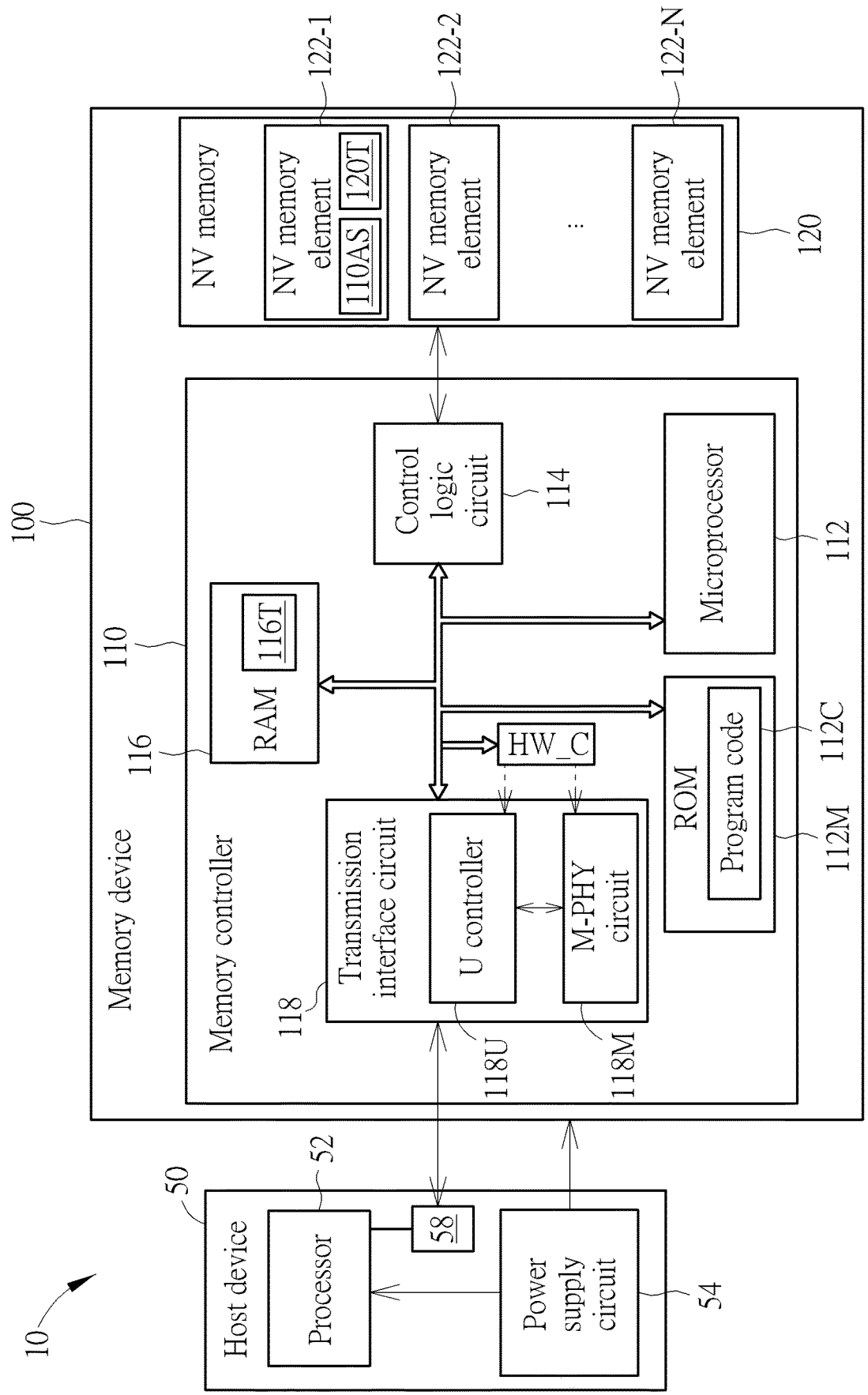
FIG. 1 is a diagram of an electronic device according to an embodiment of the present invention.

FIG. 1 is a diagram of an electronic device 10 according to an embodiment of the present invention, where the electronic device 10 may comprise a host device 50 and a memory device 100. The host device 50 may comprise at least one processor (e.g., one or more processors) which may be collectively referred to as the processor 52, a power supply circuit 54, and a transmission interface circuit 58, where the processor 52 and the transmission interface circuit 58 may be coupled to each other through a bus, and may be coupled to the power supply circuit 54 to obtain power. The processor 52 may be arranged to control operations of the host device 50, and the power supply circuit 54 may be arranged to provide the processor 52, the transmission interface circuit 58, and the memory device 100 with power, and output one or more driving voltages to the memory device 100, where the memory device 100 may provide the host device 50 with storage space, and may obtain the one or more driving voltages from the host device 50, to be the power of the memory device 100. Examples of the host device 50 may include, but are not limited to: a multifunctional mobile phone, a tablet computer, a wearable device, and a personal computer such as a desktop computer and a laptop computer. Examples of the memory device 100 may include, but are not limited to: a portable memory device (e.g., a memory card conforming to the SD/MMC, CF, MS or XD specification), a solid state drive (SSD), and various types of embedded memory devices (e.g., an embedded memory device conforming to the UFS or eMMC specification). According to this embodiment, the memory device 100 may comprise a controller such as a memory controller 110, and may further comprise a non-volatile (NV) memory 120, where the controller is arranged to access the NV memory 120, and the NV memory 120 is arranged to store information. The NV memory 120 may comprise at least one NV memory element (e.g., one or more NV memory elements), such as a plurality of NV memory elements 122-1, 122-2, . . . , and 122-N, where "N" may represent a positive integer that is greater than one. For example, the NV memory 120 may be a flash memory, and the plurality of NV memory elements 122-1, 122-2, . . . , and 122-N may be a plurality of flash memory chips or a plurality of flash memory dies, respectively, but the present invention is not limited thereto.

As shown in FIG. 1, the memory controller 110 may comprise a processing circuit such as a microprocessor 112, a storage unit such as a read only memory (ROM) 112M, a hardware control circuit 113 (labeled "HW_C" for brevity), a control logic circuit 114, a RAM 116 (which may be implemented by way of SRAM, for example), and a transmission interface circuit 118, where at least one portion (e.g., a portion or all) of the above components may be coupled to one another via a bus. The RAM 116 may be arranged to provide the memory controller 110 with internal storage space (for example, may temporarily store information), but the present invention is not limited thereto. In addition, the ROM 112M of this embodiment is arranged to store a program code 112C, and the microprocessor 112 is arranged to execute the program code 112C to control the access of the NV memory 120. Please note that, the program code 112C may also be stored in the RAM 116 or any type of memory. Additionally, the control logic circuit 114 may be arranged to control the NV memory 120. The control logic circuit 114 may comprise an error correction code (ECC) circuit (not shown in FIG. 1), which may perform ECC encoding and ECC decoding, to protect data, and/or perform error correction, and the transmission interface circuit 118 may comprise multiple sub-circuits, which may interact with each other to perform communications. The transmission interface circuit 118 may conform to one or more communications specifications among various communications specifications (e.g., the Serial Advanced Technology Attachment (SATA) specification, Universal Serial Bus (USB) specification, Peripheral Component Interconnect Express (PCIe) specification, embedded Multi Media Card (eMMC) specification, and Universal Flash Storage (UFS) specification), and may perform communications with the host device 50 (e.g., the transmission interface circuit 58) according to the one or more communications specifications for the memory device 100. Similarly, the transmission interface circuit 58 may conform to the one or more communications specifications, and may perform communications with the memory device 100 (e.g., the transmission interface circuit 118) according to the one or more communications specifications for the host device 50. For example, the multiple sub-circuits of the transmission interface circuit 118 may comprise a physical layer (PHY) circuit such as a MIPI-PHY (M-PHY) circuit 118M, and at least one upper layer (U) controller (e.g., one or more upper layer controllers) which may be collectively referred to as the upper layer controller 118U (labeled "U controller" for brevity), and the transmission interface circuit 58 may be implemented to have a circuitry architecture (e.g., multiple corresponding sub-circuits) similar to or the same as that of the transmission interface circuit 118.

In this embodiment, the host device 50 may transmit a plurality of host commands and corresponding logical addresses to the memory controller 110, to access the NV memory 120 within the memory device 100, indirectly. The memory controller 110 receives the plurality of host commands and the logical addresses, and translates the plurality of host commands into memory operating commands (which may be referred to as operating commands, for brevity), respectively, and further controls the NV memory 120 with the operating commands to perform reading or writing/programing upon the memory units or data pages of specific physical addresses within the NV memory 120, where the physical addresses can be associated with the logical addresses. For example, the memory controller 110 may generate or update at least one logical-to-physical (L2P) address mapping table to manage the relationship between the physical addresses and the logical addresses. The NV memory 120 may store a global L2P address mapping table 120T, for the memory controller 110 to control the memory device 100 to access data in the NV memory 120, but the present invention is not limited thereto. For example, the NV memory 120 may store an auxiliary setting management table 110AS, for providing the memory device 100 (e.g., the memory controller 110) with an auxiliary setting management function. The memory controller 110 (e.g., the processing circuit such as the microprocessor 112) may load the auxiliary setting management table 110AS from the NV memory 120 into at least one storage unit (e.g., one or more one storage units) within the hardware control circuit 113 during initialization of the memory device 100 (e.g., the memory controller 110).

For better comprehension, the global L2P address mapping table 120T may be located in a predetermined region within the NV memory element 122-1, such as a system region, where the auxiliary setting management table 110AS may be located in another predetermined region within the NV memory element 122-1, but the present invention is not limited thereto. For example, the global L2P address mapping table 120T may be divided into a plurality of local L2P address mapping tables, and the local L2P address mapping tables may be stored in one or more of the NV memory elements 122-1, 122-2, . . . , and 122-N, and more particularly, may be stored in the NV memory elements 122-1, 122-2, . . . , and 122-N, respectively, where the auxiliary setting management table 110AS may be stored in any of the NV memory elements 122-1, 122-2, . . . , and 122-N. When there is a needed, the memory controller 110 may load at least one portion (e.g., a portion or all) of the global L2P address mapping table 120T into the RAM 116 or other memories. For example, the memory controller 110 may load a local L2P address mapping table among the plurality of local L2P address mapping tables into the RAM 116 to be a temporary L2P address mapping table 116T, for accessing data in the NV memory 120 according to the local L2P address mapping table which is stored as the temporary L2P address mapping table 116T, but the present invention is not limited thereto.

In addition, the aforementioned at least one NV memory element (e.g., the one or more NV memory elements such as {122-1, 122-2, . . . , 122-N}) may comprise a plurality of blocks, where the minimum unit that the memory controller 110 may perform operations of erasing data on the NV memory 120 may be a block, and the minimum unit that the memory controller 110 may perform operations of writing data on the NV memory 120 may be a page, but the present invention is not limited thereto. For example, any NV memory element 122-$n$ (where "n" may represent any integer in the interval [1, N]) within the NV memory elements 122-1, 122-2, . . . , and 122-N, may comprise multiple blocks, and a block within the multiple blocks may comprise and record a specific number of pages, where the memory controller 110 may access a certain page of a certain block within the multiple blocks according to a block address and a page address.

Figure 2:
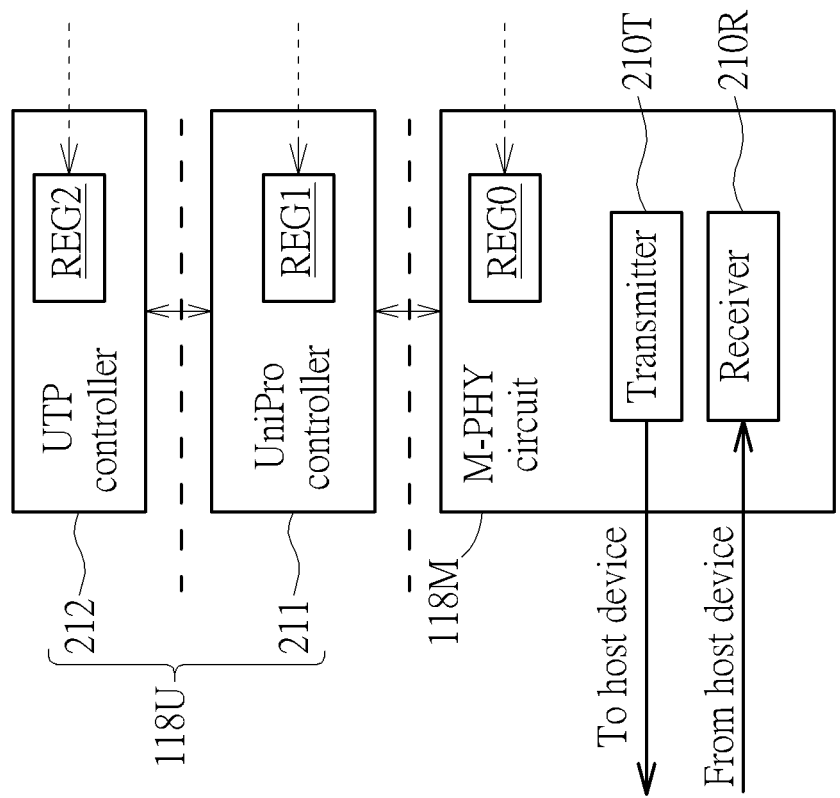
FIG. 2 illustrates an auxiliary setting control scheme of a method for performing automatic setting control (e.g., automatic parameter setting control) of a memory device such as that shown in FIG. 1 in a predetermined communications architecture (e.g., a UFS communications architecture) with aid of auxiliary setting management according to an embodiment of the present invention.

FIG. 2 illustrates an auxiliary setting control scheme of a method for performing automatic setting control (e.g., automatic parameter setting control) of a memory device such as that shown in FIG. 1 in a predetermined communications architecture (e.g., a UFS communications architecture) with aid of auxiliary setting management according to an embodiment of the present invention. The method can be applied to the architecture shown in FIG. 1, for example, the electronic device 10, the memory device 100, and the memory controller 110, and more particularly, the components within the memory controller 110, such as the microprocessor 112, the hardware control circuit 113, the transmission interface circuit 118, etc. For better comprehension, the transmission interface circuit 118 may be logically divided into multiple layers, and the physical layer (PHY) of the PHY circuit (e.g., the M-PHY circuit 118M) in the transmission interface circuit 118 may be regarded as a bottom layer. For example, the aforementioned at least one upper layer controller such as the upper layer controller 118U may comprise multiple upper layer controllers respectively corresponding to multiple upper layers, such as a UniPro controller 211 and a UFS Transport Protocol (UTP) controller 212, where the M-PHY circuit 118M may correspond to the bottom layer below the upper layers.

As shown in FIG. 2, the M-PHY circuit 118M may comprise a register circuit REG0, a transmitter 210T and a receiver 210R, the UniPro controller 211 may comprise a register circuit REG1, and the UTP controller 212 may comprise a register circuit REG2. The M-PHY circuit 118M may perform operations of the physical layer according to a clock generated by a phase-locked loop (PLL) therein (not shown), and more particularly, may utilize the transmitter 210T and the receiver 210R to transmit information such as data, etc. to the host device 50 (e.g., the transmission interface circuit 58) and receive information such as data, etc. from the host device 50 (e.g., the transmission interface circuit 58), respectively. In addition, the UniPro controller 211 may control operations of the M-PHY circuit 118M according to the MIPI UniPro specification. For example, the register circuits REG0, REG1 and REG2 can be implemented as control registers for setting parameters of the M-PHY circuit 118M (e.g., transmitter 210T, the receiver 210R, etc. therein), the UniPro controller 211 and the UTP controller 212, respectively, where the register values of the register circuits REG0, REG1 and REG2 may indicate the parameters of the M-PHY circuit 118M, the UniPro controller 211 and the UTP controller 212, respectively, but the present invention is not limited thereto.

Figure 3:
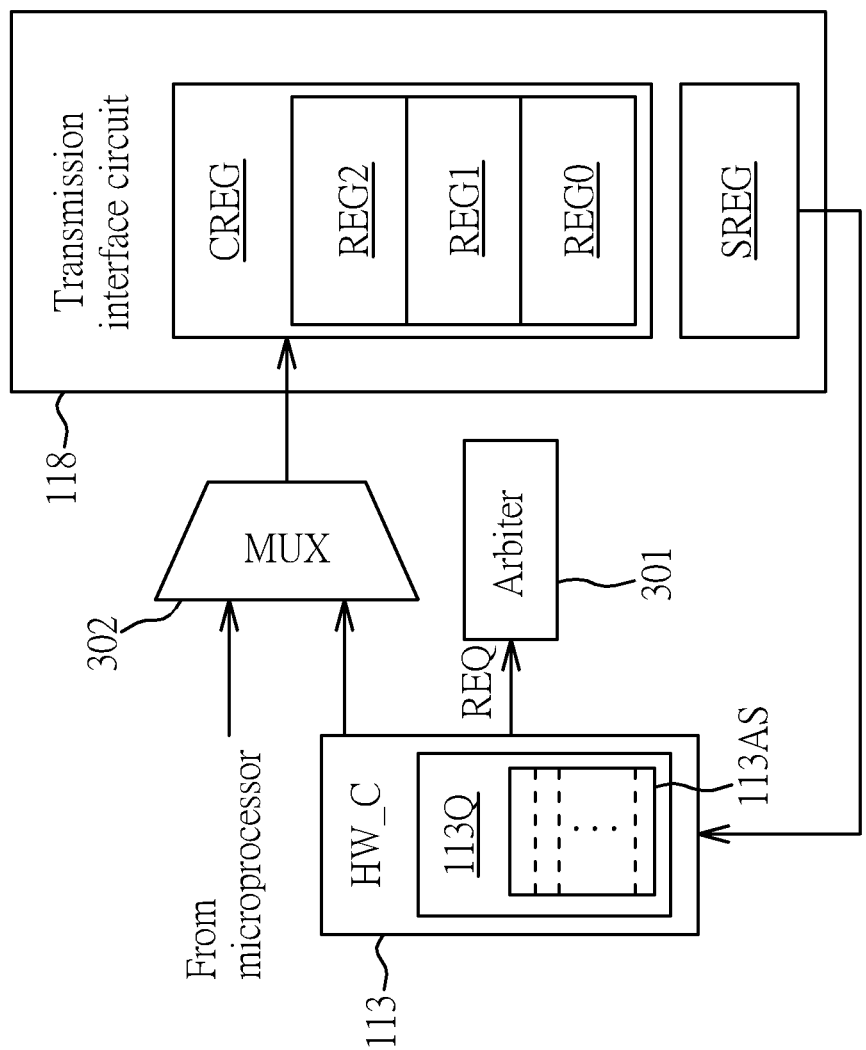
FIG. 3 illustrates some implementation details of the auxiliary setting control scheme shown in FIG. 2 according to an embodiment of the present invention.

FIG. 3 illustrates some implementation details of the auxiliary setting control scheme shown in FIG. 2 according to an embodiment of the present invention. The transmission interface circuit 118 may comprise at least one control register circuit (e.g., one or more control register circuits) which may be collectively referred to as the control register circuit CREG, and at least one state register circuit (e.g., one or more state register circuits) which may be collectively referred to as the state register circuit SREG. For example, the control register circuit CREG may comprise the register circuits REG0, REG1 and REG2. In addition, the hardware control circuit 113 (labeled "HW_C" for brevity) may comprise a command queue 113Q. During initialization of the memory device 100 (e.g., the memory controller 110), the memory controller 110 (e.g., the processing circuit such as the microprocessor 112) may load the auxiliary setting management table 110AS from the NV memory 120 into the aforementioned at least one storage unit (e.g., the one or more one storage units) within the hardware control circuit 113, such as the command queue 113Q, to be the auxiliary setting management table 113AS. Additionally, the memory controller 110 may further comprise an arbiter 301 and a multiplexer circuit 302 (labeled "MUX" for brevity).

For better comprehension, the bus in the memory controller 110 may conform to a predetermined on-chip interconnect specification such as the ARM Advanced Microcontroller Bus Architecture (AMBA), and more particularly, may be implemented as the AMBA Advanced High-performance Bus (AHB), and any control path among the control path starting from the microprocessor 112, passing through the multiplexer circuit 302 and reaching the control register circuit CREG and the control path starting from the hardware control circuit 113, passing through the multiplexer circuit 302 and reaching the control register circuit CREG may be regarded as a candidate control path on the AHB, but the present invention is not limited thereto.

When any event occurs (e.g., as indicated by the state register circuit SREG), the hardware control circuit 113 can determine whether the any event is a qualified event. For the case that the any event is a qualified event, the hardware control circuit 113 can request attribute control over the transmission interface circuit 118, and more particularly, send a request signal REQ indicating a request to the arbiter 301, for example, by setting the request signal REQ to have a first predetermined logical value such as the logical value "1", to ask for disabling the control path that starts from the microprocessor 112, passes through the multiplexer circuit 302 and reaches the control register circuit CREG and enabling the control path that starts from the hardware control circuit 113, passes through the multiplexer circuit 302 and reaches the control register circuit CREG. The arbiter 301 can enable only one control path among these two control paths and disable the other control path among these two control paths. When the arbiter 301 grants the request indicated by the request signal REQ, the hardware control circuit 113 can compare the any event with at least one portion (e.g., a portion or all) of multiple predetermined events associated with multiple entries of the auxiliary setting management table 113AS to selectively update the register values of the control register circuit CREG (e.g., the register circuits REG0, REG1 and REG2). More particularly, the hardware control circuit 113 can read any entry among the multiple entries of the auxiliary setting management table 113AS from the command queue 113Q, and compare the any event with a predetermined event associated with the any entry among the multiple predetermined events to determine whether to update the register values of the control register circuit CREG according to the any entry. For example, when the any event matches this predetermined event associated with the any entry, the hardware control circuit 113 can update the register values of the control register circuit CREG according to the any entry. For another example, when the any event does not match this predetermined event associated with the any entry, the hardware control circuit 113 can prevent updating the register values of the control register circuit CREG according to the any entry, and more particularly, can try with the next entry among the multiple entries. In some examples, in a situation where none of the multiple predetermined events is equal to the any event, the hardware control circuit 113 may have tried multiple times without triggering updating the register values of the control register circuit CREG until all events among the multiple predetermined events associated with the multiple entries have been compared with the any event. Afterward, the hardware control circuit 113 can control the request signal REQ sent to the arbiter 301 to indicate cancellation of the request, for example, by setting the request signal REQ to have a second predetermined logical value such as the logical value "0", to ask for disabling the control path that starts from the hardware control circuit 113, passes through the multiplexer circuit 302 and reaches the control register circuit CREG and enabling the control path that starts from the microprocessor 112, passes through the multiplexer circuit 302 and reaches the control register circuit CREG.

As shown in FIG. 3, the hardware control circuit 113 is coupled to the state register circuit SREG, and more particularly, is arranged to monitor multiple states of the transmission interface circuit 118 (e.g., the M-PHY circuit 118M, the UniPro controller 211 and the UTP controller 212) to determine whether any state transition of the multiple states occur, for detecting the occurrence of the any event. For brevity, similar descriptions for this embodiment are not repeated in detail here.

Figure 4:
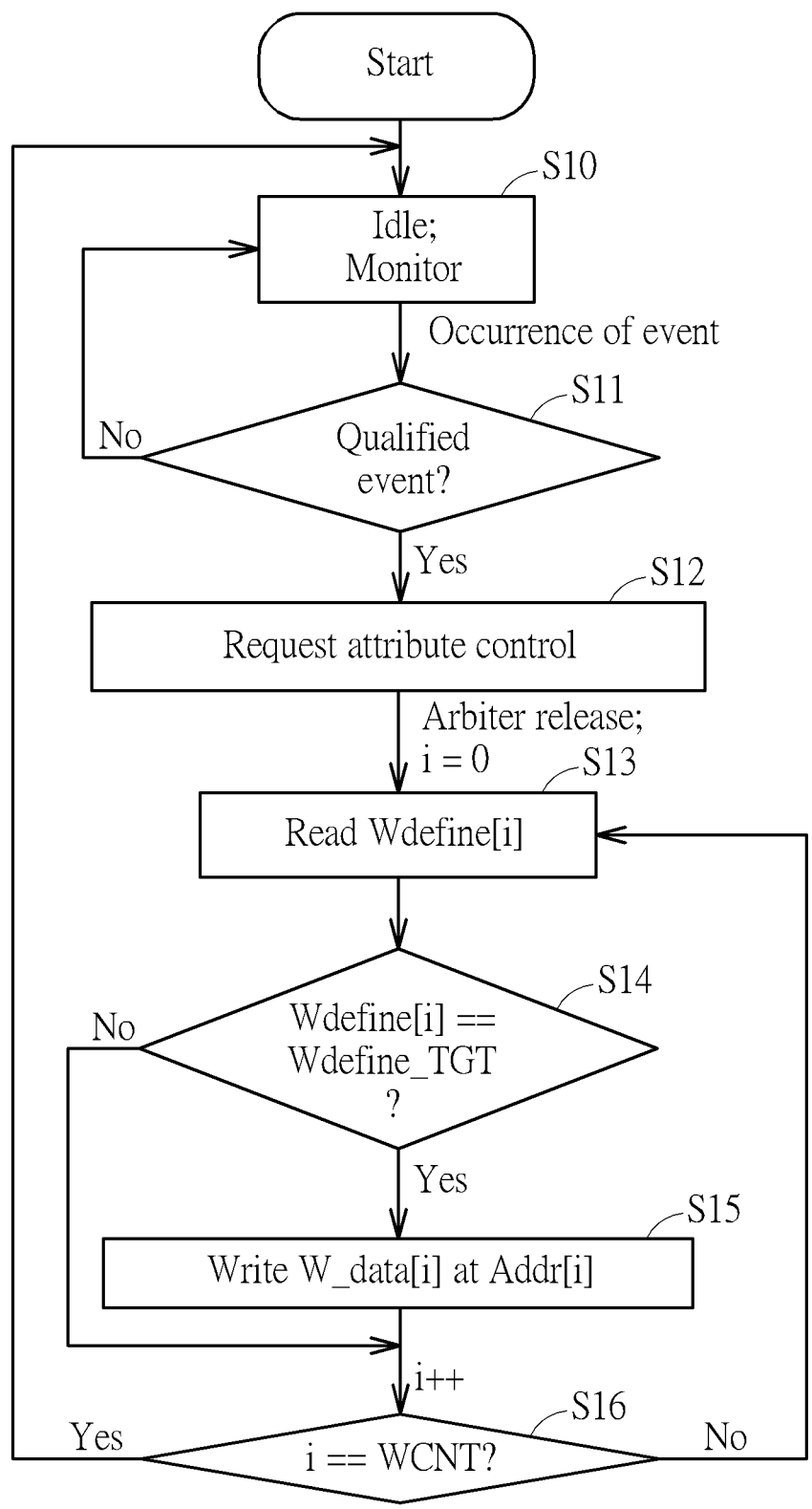
FIG. 4 illustrates a flexible setting control scheme of the method according to an embodiment of the present invention.

FIG. 4 illustrates a flexible setting control scheme of the method according to an embodiment of the present invention. For example, after the initialization of the memory device 100 (e.g., the memory controller 110), the hardware control circuit 113 may enter an idle state.

In Step S10, the hardware control circuit 113 may stay in the idle state (labeled "Idle" for brevity), and may monitor the transmission interface circuit 118 (e.g., the state register circuit SREG) to determine whether any event such as that mentioned above occurs (labeled "Monitor" for brevity). For example, in response to the occurrence of the any event, Step S11 is entered.

In Step S11, the hardware control circuit 113 can determine whether the any event is a qualified event. If Yes, Step S12 is entered; if No, Step S11 is entered. For example, the hardware control circuit 113 may use an event mask that is associated with a plurality of predetermined qualified events to determine whether the any event is one of the plurality of predetermined qualified events, but the present invention is not limited thereto.

In Step S12, the hardware control circuit 113 can request the attribute control over the transmission interface circuit 118, and more particularly, send the request signal REQ indicating the request to the arbiter 301, for example, by setting the request signal REQ to have the first predetermined logical value such as the logical value "1", to ask for disabling the control path that starts from the microprocessor 112, passes through the multiplexer circuit 302 and reaches the control register circuit CREG and enabling the control path that starts from the hardware control circuit 113, passes through the multiplexer circuit 302 and reaches the control register circuit CREG.

In Step S13, when the arbiter 301 grants the request indicated by the request signal REQ and releases the associated hardware resources (e.g., the control path of the hardware control circuit 113 and the control register circuit CREG) to the hardware control circuit 113 (labeled "Arbiter release" for brevity), the hardware control circuit 113 can read a write-definition entry code Wdefine[i] in the $i^{th}$ entry among the multiple entries of the auxiliary setting management table 113AS from the command queue 113Q. For better comprehension, the loop index i may be an integer that is greater than one, where an initial value of the loop index i may be equal to zero (labeled "i=0" for brevity) when at least one loop comprising Steps S13-S16 is entered, but the present invention is not limited thereto.

TABLE 1

| Write-definition entry code Wdefine[WCNT:0] | Address | Data |
|---|---|---|
| Wdefine[0] | Addr[0] | W_data[0] |
| Wdefine[1] | Addr[1] | W_data[1] |
| ... | ... | ... |
| Wdefine[WCNT-1] | Addr[WCNT-1] | W_data[WCNT-1] |

Table 1 illustrates an example of the format of the auxiliary setting management table 113AS (e.g., the auxiliary setting management table 110AS), where the multiple entries thereof may comprise WCNT entries {{Wdefine[0], Addr[0], W_data[0]}, {Wdefine[1], Addr[1], W_data[1]}, ..., {Wdefine[WCNT-1], Addr[WCNT-1], W_data[WCNT-1]}}, and the entry count WCNT of these entries may be an integer that is greater than two, but the present invention is not limited thereto. In addition, the $i^{th}$ entry {Wdefine[i], Addr[i], W_data[i]} among the WCNT entries {{Wdefine[0], Addr[0], W_data[0]}, {Wdefine[1], Addr[1], W_data[1]}, ..., {Wdefine[WCNT-1], Addr[WCNT-1], W_data[WCNT-1]}} may comprise the write-definition entry code Wdefine[i], the address Addr[i] and the Data W_data[i], and may be regarded as a hardware write command for indicating writing the Data W_data[i] at the address Addr[i] within the control register circuit CREG. When there is a need, the hardware control circuit 113 can execute the hardware write command such as the $i^{th}$ entry {Wdefine[i], Addr[i], W_data[i]} to write the Data W_data[i] at the address Addr[i] within the control register circuit CREG, for controlling the transmission interface circuit 118 (e.g., the multiple sub-circuits therein, such as the M-PHY circuit 118M, the UniPro controller 211 and the UTP controller 212).

In the aforementioned at least one loop comprising Steps S13-S16 as shown in FIG. 4, the hardware control circuit 113 can compare the any event with at least one portion (e.g., a portion or all) of the multiple predetermined events associated with the WCNT entries {{Wdefine[0], Addr[0], W_data[0]}, {Wdefine[1], Addr[1], W_data[1]}, ..., {Wdefine[WCNT-1], Addr[WCNT-1], W_data[WCNT-1]}} to selectively update the register values of the control register circuit CREG (e.g., the register circuits REG0, REG1 and REG2). For example, the hardware control circuit 113 can read the write-definition entry code Wdefine[i] in the $i^{th}$ entry {Wdefine[i], Addr[i], W_data[i]} from the command queue 113Q as mentioned in Step S13.

In Step S14, the hardware control circuit 113 can compare the any event with the predetermined event associated with the $i^{th}$ entry {Wdefine[i], Addr[i], W_data[i]} among the multiple predetermined events, and more particularly, can convert the any event into a target write-definition entry code Wdefine_TGT associated with the any event, and determine whether the write-definition entry code Wdefine[i] is equal to the target write-definition entry code Wdefine_TGT (labeled "Wdefine[i]==Wdefine_TGT" for brevity), for determining whether to update the register values of the control register circuit CREG according to the $i^{th}$ entry {Wdefine[i], Addr[i], W_data[i]}. If Yes (e.g., Wdefine[i]=Wdefine_TGT, which may indicate that this predetermined event is equal to the any event), Step S15 is entered; if No (e.g., Wdefine[i]≠Wdefine_TGT, which may indicate that this predetermined event is not equal to the any event), Step S16 is entered.

For better comprehension, the hardware control circuit 113 can use the target write-definition entry code Wdefine_TGT and the write-definition entry code Wdefine[i] as representatives of the any event and the predetermined event associated with the $i^{th}$ entry {Wdefine[i], Addr[i], W_data

[i]}, respectively, for comparing the any event with the predetermined event associated with the $i^{th}$ entry {Wdefine[i], Addr[i], W_data[i]}. For example, the hardware control circuit 113 can convert the any event into the target write-definition entry code Wdefine_TGT associated with the any event according to a predetermined rule, where the predetermined rule may represent a predetermined function for calculating the write-definition entry code Wdefine_TGT according to the register values of the state register circuit SREG, but the present invention is not limited thereto. In addition, the predetermined event associated with the $i^{th}$ entry {Wdefine[i], Addr[i], W_data[i]} can also be converted into the write-definition entry code Wdefine[i] according to the predetermined rule, to establish a one-to-one mapping relationship between this predetermined event and the write-definition entry code Wdefine[i] among multiple one-to-one mapping relationships corresponding to all available write-definition entry codes (e.g., write-definition entry codes in the auxiliary setting management table 113AS). As the register values of the state register circuit SREG may be used as an indicator of the any event among all possible events to indicate a certain one-to-one mapping relationship among the multiple one-to-one mapping relationships, it is workable that the hardware control circuit 113 uses the target write-definition entry code Wdefine_TGT and the write-definition entry code Wdefine[i] as the representatives of the any event and the predetermined event associated with the $i^{th}$ entry {Wdefine[i], Addr[i], W_data[i]}, respectively, for comparing the any event with this predetermined event.

In Step S15, the hardware control circuit 113 can update the register values of the control register circuit CREG according to the $i^{th}$ entry {Wdefine[i], Addr[i], W_data[i]}, and more particularly, execute the hardware write command such as the $i^{th}$ entry {Wdefine[i], Addr[i], W_data[i]} to write the Data W_data[i] at the address Addr[i] within the control register circuit CREG, for controlling the transmission interface circuit 118 (e.g., the multiple sub-circuits therein, such as the M-PHY circuit 118M, the UniPro controller 211 and the UTP controller 212).

No matter whether the determination result of Step S14 is Yes or No, the hardware control circuit 113 can increase the loop index i with a predetermined increment such as one (labeled "i++" for brevity) before Step S16 entered.

In Step S16, the hardware control circuit 113 can check whether the loop index i reaches the entry count WCNT, and more particularly, determine whether the loop index i is equal to the entry count WCNT (labeled "i==WCNT" for brevity). If Yes, Step S10 is entered; if No, Step S13 is entered.

For example, when the any event matches the predetermined event associated with the it entry {Wdefine[i], Addr[i], W_data[i]}, the hardware control circuit 113 can update the register values of the control register circuit CREG according to the $i^{th}$ entry {Wdefine[i], Addr[i], W_data[i]}. For another example, when the any event does not match the predetermined event associated with the $i^{th}$ entry {Wdefine[i], Addr[i], W_data[i]}, the hardware control circuit 113 can prevent updating the register values of the control register circuit CREG according to the entry {Wdefine[i], Addr[i], W_data[i]}, and more particularly, can try with the next entry (if it exists) among the WCNT entries {{Wdefine[0], Addr[0], W_data[0]}, {Wdefine[1], Addr[1], W_data[1]}, ..., {Wdefine[WCNT-1], Addr[WCNT-1], W_data[WCNT-1]}}. In some examples, in a situation where none of the multiple predetermined events is equal to the any event, the hardware control circuit 113 may have tried WCNT times without triggering updating the register values of the control register circuit CREG until all events among the multiple predetermined events associated with the WCNT entries {{Wdefine[0], Addr[0], W_data[0]}, {Wdefine[1], Addr[1], W_data[1]} {Wdefine[WCNT-1], Addr[WCNT-1], W_data[WCNT-1]}} have been compared with the any event. Afterward, when the determination result of Step S16 is Yes, the hardware control circuit 113 can control the request signal REQ sent to the arbiter 301 to indicate the cancellation of the request, for example, by setting the request signal REQ to have the second predetermined logical value such as the logical value "0", to ask for disabling the control path that starts from the hardware control circuit 113, passes through the multiplexer circuit 302 and reaches the control register circuit CREG and enabling the control path that starts from the microprocessor 112, passes through the multiplexer circuit 302 and reaches the control register circuit CREG.

Based on the control schemes (e.g., the flexible setting control scheme) of the method, the memory controller 110 (e.g., the hardware control circuit 113) can perform automatic parameter setting on the control register circuit CREG in response to the trigger of any of the multiple predetermined events associated with the WCNT entries {{Wdefine[0], Addr[0], W_data[0]}, {Wdefine[1], Addr[1], W_data[1]}, {Wdefine[WCNT-1], Addr[WCNT-1], W_data[WCNT-1]}}, having no need to load any firmware code such as any in-system programing (ISP) code from the NV memory 120 at runtime to execute the any firmware code. For brevity, similar descriptions for this embodiment are not repeated in detail here.

For better comprehension, the method may be illustrated with the working flow shown in FIG. 4, but the present invention is not limited thereto. According to some embodiments, one or more steps may be added, deleted, or changed in the working flow shown in FIG. 4.

According to some embodiments, a first set of state register values {Curr_State} stored in a set of current-state registers {Curr_State} (e.g., the current-state registers {Curr_State[0], Curr_State[1], Curr_State[2], ...}), within the state register circuit SREG may indicate the multiple states of the transmission interface circuit 118 (e.g., the M-PHY circuit 118M, the UniPro controller 211 and the UTP controller 212), such as the current states of the transmission interface circuit 118, and a second set of state register values {Next_State} stored in a set of next-state registers {Next_State} (e.g., the next-state registers {Next_State[0], Next_State[1], Next_State[2], ...}) within the state register circuit SREG may indicate the next states of the current states, where the state register value of a certain state register may be expressed with the same symbol printed in italics for better comprehension. When detecting that the state register value Next_State[j] of a certain next-state register Next_State[j] among the set of next-state registers {Next_State} is different from the state register value Curr_State[j] of a corresponding current-state register Curr_State[j] among the set of current-state registers {Curr_State}, the hardware control circuit 113 can determine that a state transition occurs, since the difference between the respective state register values Next_State[j] and Curr_State[j] of the next-state registers Next_State[j] and the current-state register Curr_State[j] being a non-zero difference may indicate occurrence of this state transition. After the occurrence of this state transition, the state register value Curr_State[j] of the current-state register Curr_State[j] may become the same as the state register value Next_State[j] of the next-state register Next_State[j], and these two state register values Curr_State[j] and Next_State[j] may keep the same until the transmission interface circuit 118 changes the state register value Next_State[j] of the next-state register Next_State[j] to indicate the next state transition.

Figure 5:
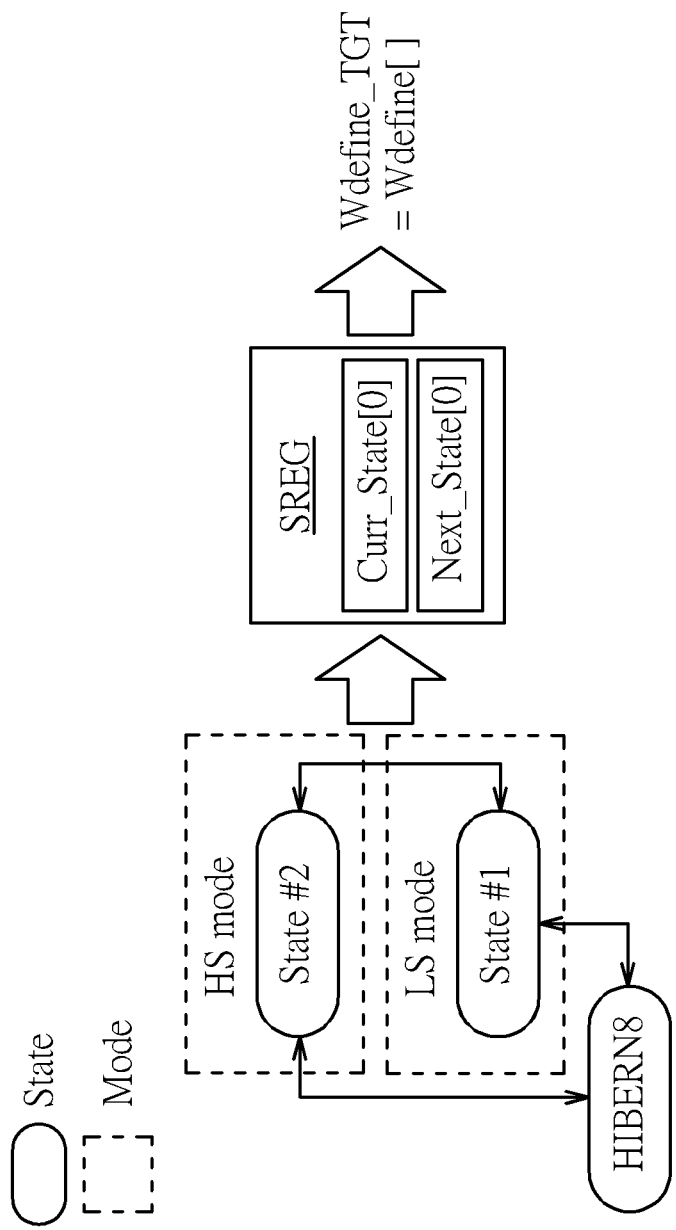
FIG. 5 illustrates a state switching control scheme of the method according to an embodiment of the present invention.

FIG. 5 illustrates a state switching control scheme of the method according to an embodiment of the present invention. For example, the transmission interface circuit 118 may enter or leave (e.g., exit from) any state among a state #1 (e.g., a sleep state) in a low speed (LS) mode, a state #2 (e.g., a stall state) in a high speed (HS) mode, and a hibernate state (labeled "HIBERN8" for brevity), but the present invention is not limited thereto. In some embodiments, the transmission interface circuit 118 may enter or leave (e.g., exit from) any of some other states.

When staying in the state #1, both of the current state and the next state can be the state #1, and the transmission interface circuit 118 can keep both of the respective state register values Curr_State[0] and Next_State[0] of the current-state register Curr_State[0] and the next-state registers Next_State[0] to indicate the state #1. For example, when the transmission interface circuit 118 is arranged to switch from the state #1 to the state #2, the current state and the next state can be the state #1 and the state #2, respectively, and the transmission interface circuit 118 can keep the state register value Curr_State[0] of the current-state register Curr_State[0] to indicate the state #1 and change the state register value Next_State[0] of the next-state registers Next_State[0] to indicate the state #2. When detecting that the state register value Next_State[0] of the next-state register Next_State[0] is different from the state register value Curr_State[0] of the current-state register Curr_State[0], the hardware control circuit 113 can determine that a state transition occurs, and more particularly, determine the target write-definition entry code Wdefine_TGT according to the register values of the state register circuit SREG (e.g., a two-dimensional state register value array {(Curr_State[ ], Next_State [ ])}, which may comprise the state register values {Curr_State [0], Curr_State [1], Curr_State [2], . . . } of the current-state registers {Curr_State[0], Curr_State[1], Curr_State[2], . . . } and the state register values {Next_State [0], Next_State [1], Next_State [2], . . . } of the next-state registers {Next_State[0], Next_State[1], Next_State [2], . . . }), for example, by using the predetermined function, where the event of this state transition can be taken as an example of the any event mentioned above.

Similarly, for any state transition from one state to another state among the state #1 (e.g., the sleep state) in the LS mode, the state #2 (e.g., the stall state) in the HS mode and the hibernate state (labeled "HIBERN8" for brevity), when detecting that the state register value Next_State[0] of the next-state register Next_State[0] is different from the state register value Curr_State[0] of the current-state register Curr_State[0], the hardware control circuit 113 can determine that the any state transition occurs, and more particularly, determine the target write-definition entry code Wdefine_TGT according to the register values of the state register circuit SREG (e.g., the two-dimensional state register value array {(Curr_State[ ], Next_State[ ])}), for example, by using the predetermined function, where the event of this state transition can be taken as an example of the any event mentioned above. As a result, the target write-definition entry code Wdefine_TGT can be equal to the write-definition entry code Wdefine[ ] of a certain entry {Wdefine[ ], Addr[ ], W_data[ ]} among the WCNT entries {{Wdefine[0], Addr[0], W_data[0]}, {Wdefine[1], Addr[1], W_data[1]}, {Wdefine[WCNT−1], Addr[WCNT−1], W_data[WCNT−1]}}. For brevity, similar descriptions for this embodiment are not repeated in detail here.

Figure 6:
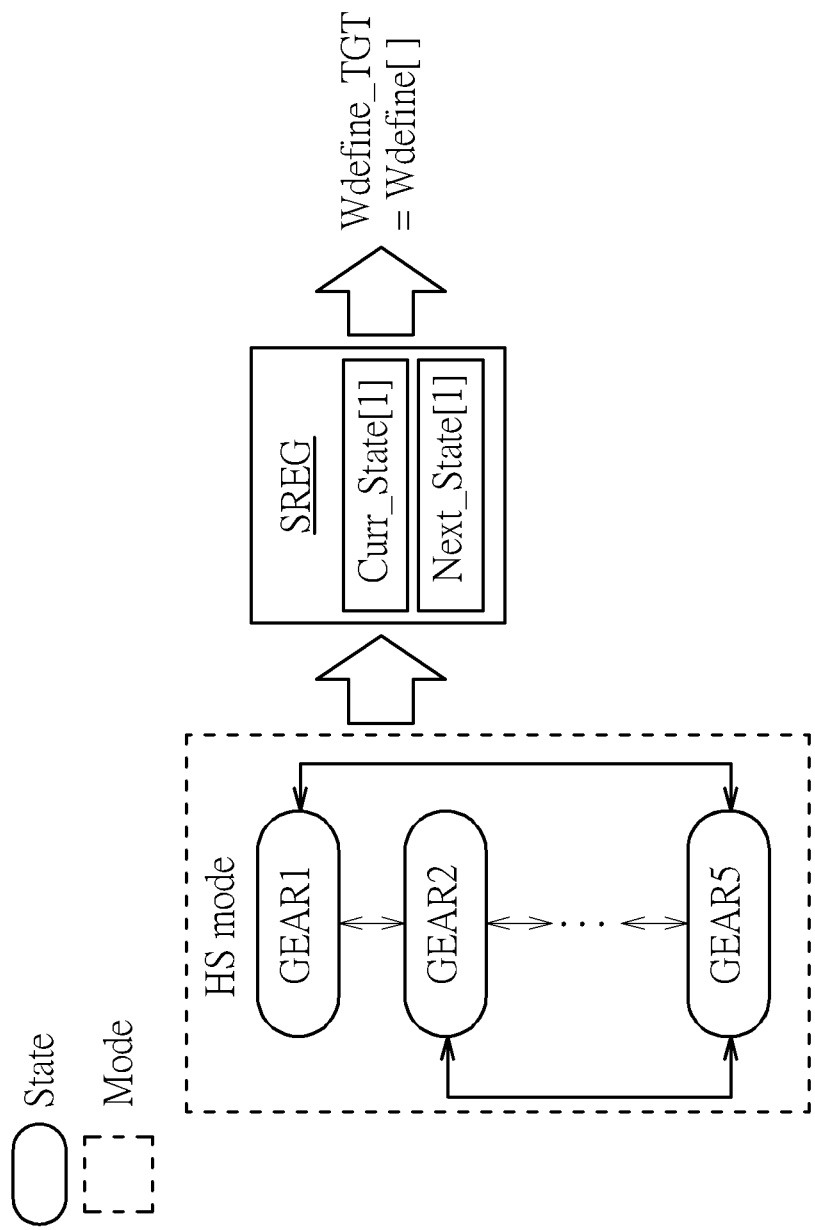
FIG. 6 illustrates a state switching control scheme of the method according to another embodiment of the present invention.

FIG. 6 illustrates a state switching control scheme of the method according to another embodiment of the present invention. For example, the transmission interface circuit 118 may enter or leave (e.g., exit from) any state among a HS-GEAR1 state (labeled "GEAR1" for brevity), a HS-GEAR2 state (labeled "GEAR2" for brevity), . . . and a HS-GEARS state (labeled "GEARS" for brevity) in the HS mode, but the present invention is not limited thereto. In some embodiments, the transmission interface circuit 118 may enter or leave (e.g., exit from) any of some other states.

When staying in the HS-GEAR1 state, both of the current state and the next state can be the HS-GEAR1 state, and the transmission interface circuit 118 can keep both of the respective state register values Curr_State[1] and Next_State[1] of the current-state register Curr_State[1] and the next-state registers Next_State[1] to indicate the HS-GEAR1 state. For example, when the transmission interface circuit 118 is arranged to switch from the HS-GEAR1 state to the HS-GEAR2 state, the current state and the next state can be the HS-GEAR1 state and the HS-GEAR2 state, respectively, and the transmission interface circuit 118 can keep the state register value Curr_State[1] of the current-state register Curr_State[1] to indicate the HS-GEAR1 state and change the state register value Next_State[1] of the next-state registers Next_State[1] to indicate the HS-GEAR2 state. When detecting that the state register value Next_State[1] of the next-state register Next_State[1] is different from the state register value Curr_State[1] of the current-state register Curr_State[1], the hardware control circuit 113 can determine that a state transition occurs, and more particularly, determine the target write-definition entry code Wdefine_TGT according to the register values of the state register circuit SREG (e.g., the two-dimensional state register value array {(Curr_State[ ], Next_State[ ])}), for example, by using the predetermined function, where the event of this state transition can be taken as an example of the any event mentioned above.

Similarly, for any state transition from one state to another state among the HS-GEAR1 state, the HS-GEAR2 state, . . . and the HS-GEARS state in the HS mode, when detecting that the state register value Next_State[1] of the next-state register Next_State[1] is different from the state register value Curr_State[1] of the current-state register Curr_State[1], the hardware control circuit 113 can determine that the any state transition occurs, and more particularly, determine the target write-definition entry code Wdefine_TGT according to the register values of the state register circuit SREG (e.g., the two-dimensional state register value array {(Curr_State[ ], Next_State[ ])}), for example, by using the predetermined function, where the event of this state transition can be taken as an example of the any event mentioned above. As a result, the target write-definition entry code Wdefine_TGT can be equal to the write-definition entry code Wdefine[ ] of a certain entry {Wdefine[ ], Addr[ ], W_data[ ]} among the WCNT entries {{Wdefine[0], Addr[0], W_data[0]}, {Wdefine[1], Addr[1], W_data[1]}, {Wdefine[WCNT−1], Addr[WCNT−1], W_data[WCNT−1]}}. For brevity, similar descriptions for this embodiment are not repeated in detail here.

Figure 7:
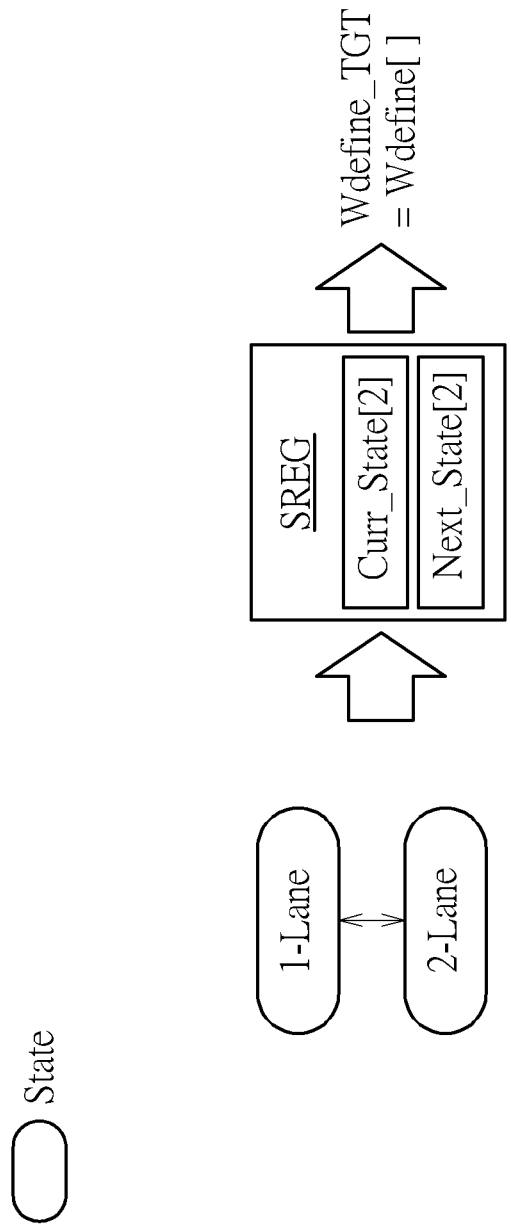
FIG. 7 illustrates a state switching control scheme of the method according to yet another embodiment of the present invention.

FIG. 7 illustrates a state switching control scheme of the method according to yet another embodiment of the present invention. For example, the transmission interface circuit 118 may enter or leave (e.g., exit from) any state among a one-lane (1-Lane) state (labeled "1-Lane" for brevity) and a two-lane (2-Lane) state (labeled "2-Lane" for brevity), but the present invention is not limited thereto. In some embodiments, the transmission interface circuit 118 may enter or leave (e.g., exit from) any of some other states.

When staying in the 1-Lane state, both of the current state and the next state can be the 1-Lane state, and the transmission interface circuit 118 can keep both of the respective state register values Curr_State[2] and Next_State[2] of the current-state register Curr_State[2] and the next-state registers Next_State[2] to indicate the 1-Lane state. For example, when the transmission interface circuit 118 is arranged to switch from the 1-Lane state to the 2-Lane state, the current state and the next state can be the 1-Lane state and the 2-Lane state, respectively, and the transmission interface circuit 118 can keep the state register value Curr_State[2] of the current-state register Curr_State[2] to indicate the 1-Lane state and change the state register value Next_State[2] of the next-state registers Next_State[2] to indicate the 2-Lane state. When detecting that the state register value Next_State[2] of the next-state register Next_State[2] is different from the state register value Curr_State[2] of the current-state register Curr_State[2], the hardware control circuit 113 can determine that a state transition occurs, and more particularly, determine the target write-definition entry code Wdefine_TGT according to the register values of the state register circuit SREG (e.g., the two-dimensional state register value array {(Curr_State[ ], Next_State[ ])}), for example, by using the predetermined function, where the event of this state transition can be taken as an example of the any event mentioned above.

Similarly, for any state transition from one state to another state among the 1-Lane state and the 2-Lane state, when detecting that the state register value Next_State[2] of the next-state register Next_State[2] is different from the state register value Curr_State[2] of the current-state register Curr_State[2], the hardware control circuit 113 can determine that the any state transition occurs, and more particularly, determine the target write-definition entry code Wdefine_TGT according to the register values of the state register circuit SREG (e.g., the two-dimensional state register value array {(Curr_State[ ], Next_State[ ])}), for example, by using the predetermined function, where the event of this state transition can be taken as an example of the any event mentioned above. As a result, the target write-definition entry code Wdefine_TGT can be equal to the write-definition entry code Wdefine[ ] of a certain entry {Wdefine[ ], Addr[ ], W_data[ ]} among the WCNT entries {{Wdefine[0], Addr[0], W_data[0]}, {Wdefine[1], Addr[1], W_data [1]}, . . . , {Wdefine[WCNT−1], Addr[WCNT−1], W_data[WCNT−1]}}. For brevity, similar descriptions for this embodiment are not repeated in detail here.

TABLE 2

| Write-definition entry code Wdefine[3:0] | Address | Data |
| --- | --- | --- |
| Wdefine[0] (e.g., HS, enter H8) | Addr[0] | W_data[0] |
| Wdefine[1] (e.g., HS, exit from H8) | Addr[1] | W_data[1] |
| Wdefine[2] (e.g., HS, exit from H8) | Addr[2] | W_data[2] |
| Wdefine[3] (e.g., HS, exit from H8) | Addr[3] | W_data[3] |
| . . . | . . . | . . . |

Table 2 illustrates a set of predefined hardware write commands in the command queue 113Q, such as a set of entries {{Wdefine[0], Addr[0], W_data[0]}, {Wdefine[1], Addr[1], W_data[1]}, {Wdefine[2], Addr[2], W_data[2]}, {Wdefine[3], Addr[3], W_data[3]}, . . . }, according to an embodiment of the present invention, where the symbol " . . . " may indicate that some table contents may be omitted. For example, some of the events associated with the set of entries may be described as follows:
  (1) the event associated with the $0^{th}$ entry comprising the write-definition entry code Wdefine[0] may represent the event of the state transition from the state #2 in the HS mode to the hibernate state (labeled "HS, enter H8" for brevity);
  (2) the event associated with the $1^{st}$ entry comprising the write-definition entry code Wdefine[1] may represent the event of the state transition from the hibernate state to the state #2 in the HS mode (labeled "HS, exit from H8" for brevity);
  (3) the event associated with the $2^{nd}$ entry comprising the write-definition entry code Wdefine[2] may represent the event of the state transition from the hibernate state to the state #2 in the HS mode (labeled "HS, exit from H8" for brevity); and
  (4) the event associated with the $3^{rd}$ entry comprising the write-definition entry code Wdefine[3] may represent the event of the state transition from the hibernate state to the state #2 in the HS mode (labeled "HS, exit from H8" for brevity);
where some of the events associated with the set of entries may be the same (e.g., the write-definition entry codes Wdefine[1], Wdefine[2] and Wdefine[3] may be equal to each other), but the present invention is not limited thereto. When performing initialization of the memory device 100 (e.g., the memory controller 110), the microprocessor 112 can fill the set of predefined hardware write commands into the command queue 113Q, to allow the hardware control circuit 113 to perform the automatic parameter setting on the control register circuit CREG in response to the trigger of any of the events associated with the set of entries, having no need to load any firmware code such as any ISP code from the NV memory 120 at runtime to execute the any firmware code. For brevity, similar descriptions for this embodiment are not repeated in detail here.

According to some embodiments, in response to the automatic parameter setting (e.g., the control register values in the control register circuit CREG that are updated by the hardware control circuit 113), the transmission interface circuit 118 can perform associated operations corresponding to the control register values in the control register circuit CREG, and the associated operations may comprise:
  (1) turning on the power of the transmission interface circuit 118 (e.g., the M-PHY circuit 118M);
  (2) turning off the power of the transmission interface circuit 118 (e.g., the M-PHY circuit 118M);
  (3) turning on a phase-locked loop (PLL) in the M-PHY circuit 118M;
  (4) turning off the PLL in the M-PHY circuit 118M;
  (5) turning on an oscillator in the M-PHY circuit 118M;
  (6) turning off the oscillator in the M-PHY circuit 118M;
  (7) changing a voltage in the transmission interface circuit 118 (e.g., the M-PHY circuit 118M); and
  (8) changing a current in the transmission interface circuit 118 (e.g., the M-PHY circuit 118M); but the present invention is not limited thereto. For brevity, similar descriptions for these embodiments are not repeated in detail here.

Figure 8:
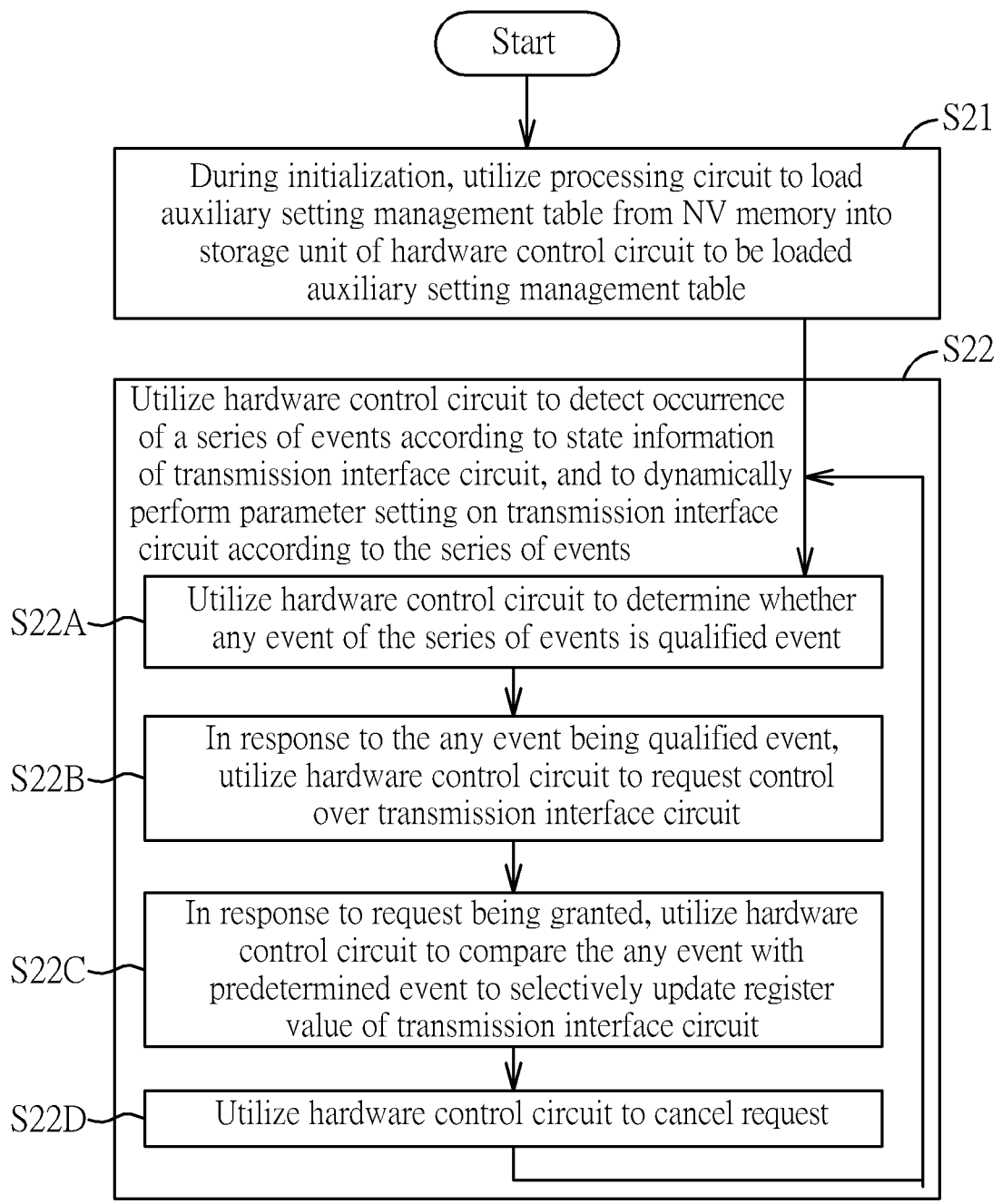
FIG. 8 illustrates a working flow of the method according to an embodiment of the present invention.

FIG. 8 illustrates a working flow of the method according to an embodiment of the present invention.

In Step S21, during the initialization of the memory device 100 (e.g., the memory controller 110), the memory device 100 (e.g., the memory controller 110) can utilize the processing circuit such as the microprocessor 112 to load the auxiliary setting management table 110AS from the NV memory 120 into the aforementioned at least one storage unit (e.g., the one or more one storage units) of the hardware control circuit 113 within the memory controller 110, such as the command queue 113Q that is embedded within the hardware control circuit 113, to be a loaded auxiliary setting management table such as the auxiliary setting management table 113AS, where the hardware control circuit 113 can be used for the automatic setting control (e.g., the automatic parameter setting control).

In Step S22, the memory device 100 (e.g., the memory controller 110) can utilize the hardware control circuit 113 within the memory controller 110, rather than the processing circuit such as the microprocessor 112, to detect occurrence of a series of events according to state information of the transmission interface circuit 118 within the memory controller 110, for example, through the aforementioned at least one state register circuit such as the state register circuit SREG, and to dynamically perform parameter setting on the transmission interface circuit 118 according to the series of events, for example, through the aforementioned at least one control register circuit such as the control register circuit CREG, for reconfiguring the transmission interface circuit 118 at runtime of the memory device 100, where the transmission interface circuit 118 can be reconfigured with the data (e.g., the field "DATA" in Table 1) carried by one or more entries among the multiple entries of the loaded auxiliary setting management table such as the auxiliary setting management table 113AS.

More particularly, multiple register values of the at least one state register circuit, such as the register values of the state register circuit SREG, may be used as an indicator of any possible event among all possible events to indicate a certain one-to-one mapping relationship among the multiple one-to-one mapping relationships mentioned above, and the state information may represent the register values of the state register circuit SREG. In addition, multiple register values of the at least one control register circuit, such as the register values of the control register circuit CREG, may indicate multiple parameters of the multiple sub-circuits (e.g., the M-PHY circuit 118M and the upper layer controller 118U as shown in FIG. 1, such as the M-PHY circuit 118M, the UniPro controller 211 and the UTP controller 212 as shown in FIG. 2) of the transmission interface circuit 118, respectively.

As shown in FIG. 8, Step S22 may comprise some sub-steps such as Steps S22A, S22B, S22C and S22D, where detecting the occurrence of the series of events according to the state information of the transmission interface circuit 118 may comprise the operation of Step S22A, and dynamically performing the parameter setting on the transmission interface circuit 118 according to the series of events may comprise the operations of Steps S22B, S22C and S22D.

In Step S22A, the memory device 100 (e.g., the memory controller 110) can utilize the hardware control circuit 113 to determine whether any event (e.g., the any possible event mentioned above) of the series of events is a qualified event, for example, as described in Step S11, where the hardware control circuit 113 can be arranged to dynamically perform the parameter setting on the transmission interface circuit 118 according to at least one qualified event (e.g., one or more qualified events) among the series of events. For example, the hardware control circuit 113 can use the event mask that is associated with the plurality of predetermined qualified events to determine whether the any event is one of the plurality of predetermined qualified events, but the present invention is not limited thereto.

In Step S22B, in response to the any event being the qualified event, the memory device 100 (e.g., the memory controller 110) can utilize the hardware control circuit 113 to request control over the transmission interface circuit 118, such as the attribute control over the transmission interface circuit 118, for example, as described in Step S12, and more particularly, to send the request signal REQ indicating the request to the arbiter 301.

In Step S22C, in response to the request of the control (e.g., the attribute control) over the transmission interface circuit 118 being granted, the memory device 100 (e.g., the memory controller 110) can utilize the hardware control circuit 113 to compare the any event (e.g., the any possible event mentioned above) with at least one portion (e.g., a portion or all) of the multiple predetermined events associated with the multiple entries (e.g., the WCNT entries {{Wdefine[0], Addr[0], W_data[0]}, {Wdefine[1], Addr[1], W_data[1]}, . . . , {Wdefine[WCNT−1], Addr[WCNT−1], W_data[WCNT−1]}}) of the loaded auxiliary setting management table such as the auxiliary setting management table 113AS to selectively update at least one register value (e.g., one or more register values) of the transmission interface circuit 118, such as the register values of the control register circuit CREG (e.g., the register circuits REG0, REG1 and REG2) in the transmission interface circuit 118, for example, as described in Steps S13-S16, for reconfiguring the transmission interface circuit 118 at runtime of the memory device 100. For example, the hardware control circuit 113 can be arranged to use the target write-definition entry code Wdefine_TGT and the write-definition entry code Wdefine[i] carried by the $i^{th}$ entry {Wdefine[i], Addr[i], W_data[i]} as the representatives of the any event and the predetermined event associated with the $i^{th}$ entry {Wdefine[i], Addr[i], W_data[i]}, respectively, for the comparing the any event with the predetermined event associated with the $i^{th}$ entry {Wdefine[i], Addr[i], W_data[i]}, in order to determine whether to reconfigure the transmission interface circuit 118 with the data W_data[i] carried by the $i^{th}$ entry {Wdefine[i], Addr[i], W_data[i]}.

The hardware control circuit 113 can read any entry (e.g., at least one portion of the $i^{th}$ entry {Wdefine[i], Addr[i], W_data[i]}, such as the write-definition entry code Wdefine[i] thereof) among the multiple entries of the auxiliary setting management table 113AS from the command queue 113Q, and compare the any event with a predetermined event associated with the any entry (e.g., the $i^{th}$ entry {Wdefine[i], Addr[i], W_data[i]}) among the multiple predetermined events, in particular, by comparing the target write-definition entry code Wdefine_TGT (which may represent the any event) with the write-definition entry code Wdefine[i] (which may represent the predetermined event associated with the $i^{th}$ entry {Wdefine[i], Addr[i], W_data[i]}), to determine whether to update the aforementioned at least one register value (e.g., the one or more register values) of the transmission interface circuit 118, such as the register values of the control register circuit CREG (e.g., the register circuits REG0, REG1 and REG2) in the transmission interface circuit 118, according to the any entry. For example, when the any event matches this predetermined event associated with the any entry (e.g., the target write-definition entry code Wdefine_TGT and the write-definition entry code Wdefine[i] are equal to each other), the hardware control circuit 113 can update the aforementioned at least one register value (e.g., the one or more register values) of the transmission interface circuit 118, such as the register values of the control register circuit CREG (e.g., the register circuits REG0, REG1 and REG2) in the transmission interface circuit 118, according to the any entry. For another example, when the any event does not match this predetermined event associated with the any entry (e.g., the target write-definition entry code Wdefine_TGT and the write-definition entry code Wdefine[i] are not equal to each other), the hardware control circuit 113 can prevent updating the aforementioned at least one register value (e.g., the one or more register values) of the transmission interface circuit 118, such as the register values of the control register circuit CREG (e.g., the register circuits REG0, REG1 and REG2), according to the any entry, and more particularly, can try with the next entry among the multiple entries. In some examples, in a situation where none of the multiple predetermined events is equal to the any event, the hardware control circuit 113 may have tried multiple times (e.g., the WCNT times mentioned above) without triggering updating the register values of the control register circuit CREG until all events among the multiple predetermined events associated with the multiple entries have been compared with the any event.

In Step S22D, the memory device 100 (e.g., the memory controller 110) can utilize the hardware control circuit 113 to cancel the request of the control (e.g., the attribute control) over the transmission interface circuit 118, and more particularly, to control the request signal REQ from the hardware control circuit 113 to the arbiter 301 to indicate the cancellation of the request.

Based on the method, the memory device 100 (e.g., the memory controller 110) can utilize the hardware control circuit 113, rather than the processing circuit such as the microprocessor 112, to dynamically perform the parameter setting on the transmission interface circuit 118, having no need to load any firmware code such as any ISP code from the NV memory 120 at runtime to execute the any firmware code for reconfiguring the transmission interface circuit 118, thereby preventing any latency due to loading and executing the any firmware code at runtime. For brevity, similar descriptions for this embodiment are not repeated in detail here.

For better comprehension, the method may be illustrated with the working flow shown in FIG. 8, but the present invention is not limited thereto. According to some embodiments, one or more steps may be added, deleted, or changed in the working flow shown in FIG. 8.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing automatic setting control of a memory device in a predetermined communications architecture with aid of auxiliary setting management, the method being applied to a memory controller of the memory device, the memory device comprising the memory controller and a non-volatile (NV) memory, the NV memory comprising at least one NV memory element, the method comprising:

during initialization of the memory device, utilizing a processing circuit within the memory controller to load an auxiliary setting management table from the NV memory into at least one storage unit of a hardware control circuit within the memory controller to be a loaded auxiliary setting management table, wherein the hardware control circuit is used for the automatic setting control; and utilizing the hardware control circuit within the memory controller to detect occurrence of a series of events according to state information of a transmission interface circuit within the memory controller, and to dynamically perform parameter setting on the transmission interface circuit according to the series of events, for reconfiguring the transmission interface circuit at runtime of the memory device, wherein the transmission interface circuit is reconfigured with data carried by one or more entries among multiple entries of the loaded auxiliary setting management table;

wherein the transmission interface circuit comprises at least one state register circuit, wherein multiple register values of the at least one state register circuit are used as an indicator of any possible event among all possible events; and the hardware control circuit is arranged to detect the occurrence of the series of events through the at least one state register circuit, wherein the state information represents the multiple register values of the at least one state register circuit.

2. The method of claim 1, wherein the transmission interface circuit comprises at least one control register circuit, wherein multiple register values of the at least one control register circuit indicate multiple parameters of multiple sub-circuits of the transmission interface circuit, respectively; and the hardware control circuit is arranged to dynamically perform the parameter setting on the transmission interface circuit according to the series of events through the at least one control register circuit.

3. The method of claim 1, wherein a command queue is embedded within the hardware control circuit, and the at least one storage unit of the hardware control circuit represents the command queue within the hardware control circuit.

4. The method of claim 1, wherein detecting the occurrence of the series of events according to the state information of the transmission interface circuit further comprises:

utilizing the hardware control circuit to determine whether any event of the series of events is a qualified event, wherein the hardware control circuit is arranged to dynamically perform the parameter setting on the transmission interface circuit according to at least one qualified event among the series of events.

5. The method of claim 1, wherein dynamically performing the parameter setting on the transmission interface circuit according to the series of events further comprises:

utilizing the hardware control circuit to request control over the transmission interface circuit;

in response to the request of the control over the transmission interface circuit being granted, utilizing the hardware control circuit to compare any event of the series of events with at least one portion of multiple predetermined events associated with the multiple entries of the loaded auxiliary setting management table to selectively update at least one register value of the transmission interface circuit, for reconfiguring the transmission interface circuit at runtime of the memory device; and utilizing the hardware control circuit to cancel the request of the control over the transmission interface circuit.

6. The method of claim 1, wherein the hardware control circuit is arranged to read any entry of the multiple entries of the loaded auxiliary setting management table, and use a target write-definition entry code and a write-definition entry code carried by the any entry as representatives of any event of the series of events and a predetermined event associated with the any entry, respectively, for comparing the any event with the predetermined event associated with the any entry, in order to determine whether to reconfigure the transmission interface circuit with data carried by the any entry.

7. The method of claim 6, wherein dynamically performing the parameter setting on the transmission interface circuit according to the series of events further comprises:

in response to the target write-definition entry code and the write-definition entry code carried by the any entry being equal to each other, utilizing the hardware control circuit to update at least one register value of the transmission interface circuit with the data carried by the any entry, for reconfiguring the transmission interface circuit at runtime of the memory device.

8. The method of claim 1, wherein the memory controller is arranged to utilize the hardware control circuit, rather than the processing circuit, to dynamically perform the parameter setting on the transmission interface circuit, having no need to load any firmware code from the NV memory at runtime to execute the any firmware code for reconfiguring the transmission interface circuit, thereby preventing any latency due to loading and executing the any firmware code at runtime.

9. A memory device, comprising:

a non-volatile (NV) memory, arranged to store information, wherein the NV memory comprises at least one NV memory element; and a memory controller, coupled to the NV memory, arranged to control operations of the memory device, wherein the memory controller comprises:

a processing circuit, arranged to control the memory controller according to a plurality of host commands from a host device, to allow the host device to access the NV memory through the memory controller;

a transmission interface circuit, arranged to perform communications with the host device; and a hardware control circuit, arranged to perform automatic setting control of the memory device;

wherein:

during initialization of the memory device, the memory controller utilizes the processing circuit within the memory controller to load an auxiliary setting management table from the NV memory into at least one storage unit of the hardware control circuit within the memory controller to be a loaded auxiliary setting management table, wherein the hardware control circuit is used for the automatic setting control; and the memory controller utilizes the hardware control circuit within the memory controller to detect occurrence of a series of events according to state information of the transmission interface circuit within the memory controller, and to dynamically perform parameter setting on the transmission interface circuit according to the series of events, for reconfiguring the transmission interface circuit at runtime of the memory device, wherein the transmission interface circuit is reconfigured with data carried by one or more entries among multiple entries of the loaded auxiliary setting management table;

wherein the transmission interface circuit comprises at least one state register circuit, wherein multiple register values of the at least one state register circuit are used as an indicator of any possible event among all possible events; and the hardware control circuit is arranged to detect the occurrence of the series of events through the at least one state register circuit, wherein the state information represents the multiple register values of the at least one state register circuit.

10. The memory device of claim 9, wherein the transmission interface circuit comprises at least one control register circuit, wherein multiple register values of the at least one control register circuit indicate multiple parameters of multiple sub-circuits of the transmission interface circuit, respectively; and the hardware control circuit is arranged to dynamically perform the parameter setting on the transmission interface circuit according to the series of events through the at least one control register circuit.

11. An electronic device comprising the memory device of claim 9, and further comprising:

the host device, coupled to the memory device, wherein the host device comprises:

at least one processor, arranged for controlling operations of the host device; and a power supply circuit, coupled to the at least one processor, arranged for providing power to the at least one processor and the memory device;

wherein the memory device provides the host device with storage space.

12. A memory controller of a memory device, the memory device comprising the memory controller and a non-volatile (NV) memory, the NV memory comprising at least one NV memory element, the memory controller comprising:

a processing circuit, arranged to control the memory controller according to a plurality of host commands from a host device, to allow the host device to access the NV memory through the memory controller;

a transmission interface circuit, arranged to perform communications with the host device; and a hardware control circuit, arranged to perform automatic setting control of the memory device;

wherein:

during initialization of the memory device, the memory controller utilizes the processing circuit within the memory controller to load an auxiliary setting management table from the NV memory into at least one storage unit of the hardware control circuit within the memory controller to be a loaded auxiliary setting management table, wherein the hardware control circuit is used for the automatic setting control; and the memory controller utilizes the hardware control circuit within the memory controller to detect occurrence of a series of events according to state information of the transmission interface circuit within the memory controller, and to dynamically perform parameter setting on the transmission interface circuit according to the series of events, for reconfiguring the transmission interface circuit at runtime of the memory device, wherein the transmission interface circuit is reconfigured with data carried by one or more entries among multiple entries of the loaded auxiliary setting management table;

wherein the transmission interface circuit comprises at least one state register circuit, wherein multiple register values of the at least one state register circuit are used as an indicator of any possible event among all possible events; and the hardware control circuit is arranged to detect the occurrence of the series of events through the at least one state register circuit, wherein the state information represents the multiple register values of the at least one state register circuit.

13. The memory controller of claim 12, wherein the transmission interface circuit comprises at least one control register circuit, wherein multiple register values of the at least one control register circuit indicate multiple parameters of multiple sub-circuits of the transmission interface circuit, respectively; and the hardware control circuit is arranged to dynamically perform the parameter setting on the transmission interface circuit according to the series of events through the at least one control register circuit.

* * * * *